United States Patent [19]

Mookherjee et al.

[11] 3,718,696

[45] Feb. 27, 1973

[54] PROCESS FOR THE PREPARATION OF MACROCYCLIC COMPOUNDS AND NOVEL COMPOUNDS PRODUCED THEREBY

[75] Inventors: Bradja D. Mookherjee, Matawan; Ernst T. Theimer, Rumson, both of N.J.

[73] Assignee: International Flavors & Fragrances Inc., New York, N.Y.

[22] Filed: March 11, 1970

[21] Appl. No.: 18,757

[52] U.S. Cl...............260/586 A, 252/132, 252/522, 260/348.5 L, 260/468 R, 260/586 R, 260/586 B, 260/617 H, 260/617 M, 260/348 C
[51] Int. Cl..........................C07c 49/27, C07c 45/02
[58] Field of Search..................................260/586 A

[56] References Cited

UNITED STATES PATENTS

| | | |
|---|---|---|
| 2,584,664 | 2/1952 | Blomquist et al..................260/586 A |
| 2,769,017 | 10/1956 | Reppe et al...................260/586 A X |
| 3,227,742 | 1/1966 | Lufont et al. .................260/586 A X |
| 2,364,041 | 11/1944 | Stevens et al.....................260/586 A |
| 2,544,737 | 3/1951 | Theobald......................260/586 A X |

*Primary Examiner*—Bernard Helfin
*Assistant Examiner*—Norman Morgenstern
*Attorney*—Brooks, Heidt & Haffner

[57] ABSTRACT

A process for preparing muscone for 1,9-cyclohexadecadiene involving a number of steps. Monoepoxidized 1,9-cyclohexadecadiene upon treatment with alkyl lithium is converted into an $\alpha,\beta$-unsaturated alcohol and oxidized into the corresponding $\alpha,\beta$-unsaturated ketone. This upon treatment with alkyl magnesium halide in the presence of cuprous chloride is converted to $\beta$-methyl-cyclohexadecenone and then hydrogenated to homomuscone ($\beta$-methyl-cyclohexadecanone). Homomuscone dibromide undergoes a Favorski rearrangement to produce a mixture $\beta$-and $\gamma$-methyl-cyclopentadecene-carboxylates (3:7) which on treatment with hydrazoic acid is converted into $\alpha$-methyl-cyclopentadecanone and muscone, respectively.

1 Claim, No Drawings

PROCESS FOR THE PREPARATION OF MACROCYCLIC COMPOUNDS AND NOVEL COMPOUNDS PRODUCED THEREBY

This invention relates to a process for the preparation of macrocyclic compounds for use in the perfume industry and to the novel macrocyclic compounds produced thereby. More specifically, the present invention relates to a process for the preparation of a mixture of muscone (3-methyl-1-cyclopentadecanone) and α-methyl-cyclopentadecanone from 1,9-cyclohexadecadiene. Additionally this invention relates to novel macrocyclic compounds, i.e., 1,2-epoxy-9-cyclohexadecene, α,β-unsaturated-cyclohexadecenol, α,β-unsaturated-cyclohexadecenone, β-methyl-cyclohexadecenone, β-methyl-cyclohexadecanone, 3-methyl-2,16-dibromo-cyclohexadecanone, and β- and γ-cyclopentadecene-carboxylates. These novel macrocyclic compounds are useful intermediates in the preparation of muscone and α-methyl-cyclopentadecanone.

The macrocyclic compounds, i.e., the mixture of muscone and α-methyl-cyclopentadecanone, prepared by the process of the present invention are musk odorants and as much are highly desirable. The odor of musk is perhaps the most universally appreciated fragrance and is usually thought of as the animal note in perfumes. A number of naturally occurring species, both of animal and vegetable origin, possess musk odors; however, only three animal sources have achieved any commercial importance. It is because of the high demand and short supply of these naturally occurring musk odorants that numerous attempts have been made, since the 1920's to synthesize compounds which would duplicate these desirable odors.

Muscone naturally occurs as a secretion of the musk deer and is a valuable perfume base. Ziegler and Weber [Ann., 512, 164 (1934)] prepared muscone by the cyclization of dinitriles in high dilution. Another method of synthesizing muscone involves the cyclization of methyl-16-bromo-5-methyl-3-oxohexadecanoate in methylethylketone with potassium carbonate at high dilution as developed by Hunsdiecker [Ber. 75B, 1197 (1942)]. These high dilution methods tend to be slow and cumbersome. The cyclization of diketenes, as reported by Bloomquist and co-workers [J. Am. Chem. Soc., 70, 30 (1948)], results in low yields of muscone. Other processes for the preparation of muscone are also available, however, applicants are unaware of any prior art process in which 1,9-cyclohexadecadiene is utilized as the starting material for the preparation of muscone and/or α-methyl-cyclopentadecanone.

It is, therefore, an object of the present invention to provide a novel process for the preparation of a mixture of muscone and α-methyl-cyclopentadecanone.

It is a further object of the present invention to provide a process for the preparation of a mixture of muscone and α-methyl-cyclopentadecanone from 1,9-cyclohexadecadiene.

It is a further object of the present invention to provide novel macrocyclic compounds.

Other objects of the present invention will be set forth in, or be apparent from, the following detailed description of the invention.

These objects are achieved by the process of the present invention which comprises the steps of:

1. Epoxidizing 1,9-cyclohexadecadiene of the structure

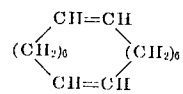

to form a monopoxidized cyclohexadecadiene of the structure

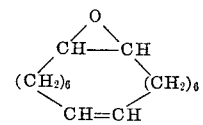

and

2. Converting said monoepoxidized cyclohexadecadiene into an α,β-unsaturated alcohol of the structure

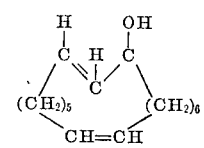

and

3. Oxidizing said α,β-unsaturated alcohol to form the corresponding α,β-unsaturated ketone of the structure

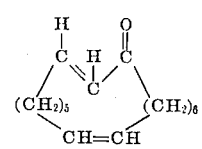

4. Treating said α,β-unsaturated ketone with an alkyl magnesium halide to convert it into β-methyl-cyclohexadecenone of the structure

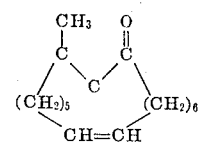

and

5. Hydrogenating said β-methyl-cyclohexadecenone to form homomuscone (β-methyl-cyclohexadecanone) of the structure

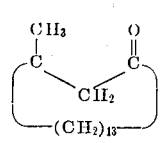

and

6. Brominating said homomuscone to form dibromohomomuscone (3-methyl-2,16-dibromo-cylohexadecanone) of the structure

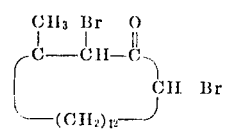

and

7. Rearranging said dibromohomomuscone to form a mixture of β- and γ-methyl-cyclopentadecene-carboxylates of the structure

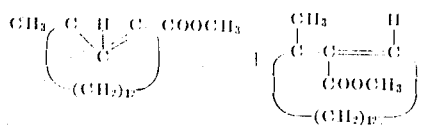

and

8. Treating said mixture of β-and γ-methylcyclopentadecene-carboxylates with hydrazoic acid to form muscone and α-methyl-cyclopentadecanone of the structure

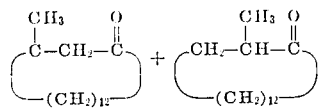

The 1,9-cyclohexadecadiene utilized as the starting material in the process of the present invention may be prepared by dimerizing cyclooctene as more fully disclosed in U.S. Pat. No. 3,439,056, granted on Apr. 15, 1969.

The first step of the process of the present invention comprises treating 1,9-cyclohexadecadiene with an oxidizing agent such as a peracid, e.g., peracetic acid, perpropionic acid, perbenzoic acid, perphthalic acid or other suitable peracid, in the presence of an alkali-metal carboxylate such as sodium acetate and in a suitable reaction medium such as an inert solvent at a reduced temperature. Suitable reaction media include methylene chloride, carbon-tetrachloride, chloroform, and the like. The reactants are used in stoichiometric proportions, care being used to insure that an excess of oxidizing agent is not employed so as to avoid the formation of diepoxides. The reaction temperature and time are interdependent. Usually, a reduced temperature of from about - 5°C to 10°C is used, although a temperature of from 0°C to about 5°C is preferred. The reaction is for practical purposes completed within about 5 hours, preferably in less than 3 hours. The desired product, monoepoxidized cyclohexadecadiene may be separated and recovered by conventional techniques including evaporation, distillation, solvent extraction and the like.

The second step of the process comprises treating 1,2-epoxy-9-cyclohexadecene with an alkyl lithium compound containing from one to four carbon atoms, such as butyl lithium, or methyl lithium, in an aliphatic hydrocarbon solvent such as hexane. The reaction temperature may vary from about 50°C to about 80°C although preferably is within the range of from 60°C to 70°C. Preferably, the alkyl lithium is utilized in a molar ratio of 1,2-epoxy-9-cyclohexadecene to alkyl lithium of about 1:1, although an excess of alkyl lithium can be utilized without any adverse effects. The alkyl lithium is desirably added slowly while maintaining the temperature of the reaction mixture below about 5°C so as to prevent undesirable side reactions. The desired α,β-unsaturated-cyclohexadecenol may be recovered in any conventional manner.

The third step of the process involves oxidizing α,β-unsaturated-cyclohexadecenol to the corresponding ketone with a suitable oxidizing agent such as chromic acid. This is generally accomplished in the presence of a strong mineral acid such as sulfuric acid and in the liquid phase (e.g., an acetone-water mixture). The oxidizing agent is preferably utilized in excess and preferably is a molar ratio of αβ-unsaturated-cyclhxadeconol to ,β-unsaturate-cyclohexadecenol agent of at least about 1:3 to insure complete oxidation. The reaction temperature is maintained at 5°C or less and preferably is at 0°C. The α,β-unsaturated-cyclohexadecenone obtained is recovered by aqueous extraction, evaporation and distillation.

The fourth step of the process comprises treating α,β-unsaturated-cyclohexadecenone with a lower alkyl magnesium halide wherein the alkyl chain contains from one to four carbon atoms and the halide is selected from the group consisting of chloride, bromide and iodide, e.g., methyl magnesium bromide, methyl magnesium iodide, and the like, in the presence of cuprous chloride. The reaction is performed in an anhydrous solvent such as ether or a similar inert vehicle.

The alkyl magnesium halide is utilized in a molar ratio of α,β-unsaturated-cyclohexadecenone to alkyl magnesium halide in a ration of about 1:1, although a slight excess of alkyl magnesium halide is desirable. The temperature of the reaction may vary over wide limits and generally is from about 5°C to 15°C. and the reaction is usually completed within a few hours. The reaction mixture is then treated with a strong acid, for example, hydrochloric acid, to decompose the complex formed, is recovered by conventional techniques such as fractional distillation and contains two isomers (cis and trans).

The fifth step of the process comprises hydrogenating β-methyl-cyclohexadecenone to form β-methyl-cyclohexadecadiene. This is conveniently performed with an hydrogenation catalyst which is sufficiently active to promote hydrogenation at low temperature and pressure, as for example a Group VIII noble metal such as palladium or platinum. The catalyst is preferably supported in a carrier such as activated carbon. The hydrogenation is accomplished in the liquid phase using an inert solvent such as a lower aliphatic alcohol, for example, methanol, ethanol, butanol and the like. Hydrogen is passed into the apparatus until no more is absorbed showing a completion of the reaction. The pressure is preferably atmospheric pressure, although pressures up to about 10 atmospheres can be utilized without any adverse effects. The temperature is preferably maintained at about 25°C to about 30°C. The desired product, homomuscone, is recovered by separation of the catalyst as by filtration and the solvent is removed as by distillution.

The sixth step of the process comprises treating β-methyl-cyclohexadecanone (homomuscone) with bromine in the presence of an anhydrous solvent, such as a mixture of benzene and ether. The bromine is added slowly to the solution of homomuscone and solvent. The bromine is preferably utilized in a molar ration of bromine to homomuscone of 2:1. The reaction is maintained at from about 20°-25°C. The hydrogen bromide liberated by the reaction is removed, e.g., by connecting a vacuum to the apparatus while raising the temperature of the solution to about 50°C, until the solution is neutral. The dibromohomomuscone formed can be recovered in a conventional manner.

The seventh step of the process comprises treating dibromohomomuscone with an alkali-metal alkoxide, such as sodium methoxide, to effect a Favorski rearrangement. In this reaction one bromine atom is eliminated as HBγ⁺ and the other is displaced by alkoxyl. The alkoxide is preferably used in a molar ratio of at least about 2 moles of alkoxide to one mole of dibromohomomuscone. The reaction temperature is maintained within the range of about 20° to 35°C. The resulting mixture of β-methyl-cyclopentadecene-carboxylate and γ-methylcyclopentadecene-carboxylate is then recovered. If desired, this mixture can be separated by conventional methods, e.g., column chromatography.

The eighth step of the process comprises treating the mixture of β-and γ-methyl-cyclopentadecene-carboxylates with hydrazoic acid to obtain a mixture of α-methyl-cyclopentadecanone and muscone. The hydrazoic acid is formed in situ by reacting a strong mineral acid, such as concentrated sulfuric acid, with a alkali metal azide such as sodium azide. The reaction is conducted in a solvent such as chloroform at a temperature of from about 35°–45°C. The derived end product may be recovered in a conventional manner as by fractional distillation.

The mixture containing the compounds muscone and α-methyl-cyclopentadecanone prepared by the process of this invention has a highly desirable and useful odor characterized as a musk odor and usually thought of as the animal note in perfumes. This mixture can be used as a component of perfume compositions to promote a musk fragrance. Perfume compositions containing from about 1.0 to about 50.0 percent of the mixture by weight based on the active fragrance ingredients before dilution are desirable and useful.

The following examples will illustrate in detail the manner in which the invention may be practiced. It will be understood, however, that the invention is not confined to the specific limitations set forth in the individual examples, but rather to the scope of the appended claims.

All percentages and ratios in the following examples, as well as in the specification and in the appended claims, are by weight, unless otherwise indicated. Temperatures are expressed in degrees centigrade and room temperature is 25°C to 30°C.

EXAMPLE I

Preparation of mixture of muscone and α-methyl cyclopentadecanone.

A. Preparation of 1,2-epoxy-9-cyclohexadecene from 1,9-cyclohexadecadiene

An apparatus consisting of a 100 ml. reaction flask fitted with a thermometer, mechanical stirrer, addition funnel and ice bath is charged with 5.0g. (0.023 mole) of 1,9-cyclohexadecadiene, 7.0g. of sodium acetate and 30 ml. of methylene chloride and cooled to 0°C. A solution containing 4.7g. (0.023 mole) 40 percent peracetic acid and 10 ml. of methylene chloride is prepared and added slowly to the flask during a one-half hour period while the temperature is maintained at 0°C. The mixture is then stirred for three hours at 0°–5 °C and allowed to return to room temperature. The mixture is poured into a 125 ml. separatory funnel containing 40 ml. of water and the layers are separated. The aqueous layer is extracted three times with 30 ml. portions of methylene chloride. The combined organic layer is then washed with a saturated sodium chloride solution until it tests neutral and then is dried over anhydrous sodium sulfate. The solvent is removed by means of a rotary evaporator yielding 5.58g. of crude product which is then chromatographed to obtain a yield of 4.5g. (90 percent yield) of 1,2-epoxy-9-cyclohexadecene.

B. Preparation of α,β-unsaturated-cyclohexadecenol from 1,2-epoxy-9-cyclohexadecene An apparatus consisting of a 500 ml. reaction flask fitted with an addition funnel, stirrer, thermometer, ice bath and reflux condenser with drying tube is flushed with nitrogen. 80 ml. (0.13 mole) of 15 percent butyl lithium in hexane is added to the reaction flask and cooled to 0°C. A solution containing 100 ml. of hexane and 30g. of the crude non-chromatographed material from part A of this Example (out of which 7.5g. was 1,9-cyclohexadecadiene) is prepared and added slowly dropwise to the butyl lithium for ½ hours, with stirring and maintenance of the temperature at 0°C. After the addition is completed, the mixture is stirred for an additional one-half hour. The temperature is then slowly raised to 65°C and the mixture is refluxed for 3 hours. The reaction mixture is cooled to 5°C and 30 ml. of water are added to this cooled mixture. The mixture is poured into a separatory funnel and the layers are separated. The organic layer is washed with water until it tests neutral and is dried. The solvent is removed by means of a rotary evaporator yielding 33g. of crude product is then chromatographed to obtain a 54 percent yield of α,β-unsaturated-cyclohexadecenol.

C. Preparation of α,β-unsaturated-cyclohexadecenone from α,β-unsaturated-cyclohexadecenol.

A chromic acid solution is prepared by cautiously adding 11 ml. of conc. sulfuric acid to a 500 ml. flask containing 10g. of chromic oxide. The mixture is cooled in an ice bath and 50 ml. of water are slowly added, resulting in the formation of a chromic acid solution.

An apparatus consisting of a 1 l. reaction flask fitted with an additional funnel, thermometer, mechanical stirrer, dry ice bath and reflux condenser is charged with 12g. of α,β-unsaturated-cyclohexadecenol and 300 ml. of acetone and cooled to 0°C. The chromic acid, as prepared above, is added dropwise with stirring until an orange-yellow color persists. The solution is stirred for 3 hours at 0°C and allowed to return to room temperature. 150 ml. of the acetone solvent is removed in vacuo without any heat. 200 ml. of water are added and the solution is extracted five times with 200 ml. portions of methylene chloride. The combined extracts are washed three times with 50 ml. portions of a saturated sodium chloride solution until it tests neutral and dried over anhydrous sodium sulfate. The remaining solvent is removed in vacuo yielding 10g. of crude product which is chromatographed to obtain 8.3g. of (70 percent yield) α,β-unsaturated-cyclohexadecenone.

D. Preparation of β-methyl-cyclohexadecenone from α,β-unsaturated-cyclohexadecenone An apparatus consisting of a 250 ml. reaction flask fitted with an adaptor, thermometer, mechanical stirrer, addition funnel, nitrogen purge, reflux condenser equipped with drying tube and dry ice bath is charged with 10 ml. (0.03 mole) of methyl magnesium bromide, 50 ml. of anhydrous ether and 0.15g. of cuprous chloride and cooled to 10°C. A solution of 5.5g. (0.024 mole) of α,β-unsaturated cyclohexadecenone and 40 ml. of anhydrous ether is prepared and slowly added to the flask over a period of ½ hours. The reaction mixture is stirred for 1 hour at 10°C decomposed by adding 25 ml. of a cold 10 percent hydrochloric acid solution. The ether layer is separated and washed three times with 20 ml. portions of a cold 10 percent bicarbonate solution and two times with 20 ml. portions of water until it tests neutral and is dried. The solvent is removed, yielding 5.7g. of crude material which is chromatographed to obtain 4.9g. (90 percent yield) of β-methyl-cyclohexadecenone.

E. Preparation of Homomuscone from β-methyl-cyclohexadecenone

An apparatus consisting of a 500 ml. reaction flask fitted with a Brown's hydrogenation apparatus connected to a hydrogen cylinder is charged with 10g. of β-methyl-cyclohexadecenone, 1.5g. of a 10 percent palladium on carbon catalyst and 200 ml. of methanol. Hydrogen is passed from the cylinder into the apparatus until no more is absorbed (940 ml.) at which point the reduction is complete. The catalyst is removed by vacuum filtration through a glass sintered funnel covered with celite and upon evaporation of the solvent in vacuo, 10 g. (100 percent yield) of the saturated ketone, homomuscone (β-methyl-cyclohexadecenone), is obtained.

F. Preparation of Dibromohomomuscone from Homomuscone

An apparatus consisting of a 500 ml. reaction flask equipped with an addition funnel, mechanical stirrer, heating bath and connected to a vacuum system is charged with 15 g. (0.06 mole) of homomuscone, 200 ml. of anhydrous benzene and 20 ml. of anhydrous ether. 19.2g. (0.12 mole) of bromine is added dropwise, at room temperature, over a period of one-half hour to the reaction flask. The hydrogen bromide liberated by the reaction is removed by turning on the vacuum system while simultaneously heating the flask to 50°C. This operation is continued until the solution in the flask tests neutral. Analysis of the product confirmed the formation of the desired dibromohomomuscone (3-methyl-2,16-dibromo-cyclohexadecanone).

G. Preparation of a mixture of β-methyl-cyclopentadecene-carboxylate and γ-methyl-cyclopentadecenecarboxylate from dibromohomomuscone The same apparatus is utilized as in step (F) above, except that the heating bath is replaced with a cooling bath. Over a 1 hour period, 7.6g. (0.14 mole) of sodium methoxide is added to the reaction flask containing the dibromohomomuscone prepared above. The temperature is maintained at room temperature by means of an ice bath. The mixture is stirred for an additional one-half hour at room temperature, and then is cooled to 5°C by means of an ice bath. 200 ml. of cold water are added and the solution is permitted to return to room temperature. The organic layer is separated, washed twice with 50 ml. portions of 5 percent hydrochloric acid and twice with 50 ml. portions of 50 percent sodium chloride until it tests neutral and it is then dried. After the solvent is removed, 19.0 g. (90 percent yield) of a mixture of β-methyl-cyclopentadecenecarboxylate and γ-methyl-cyclopentadecenecarboxylate remains.

H Preparation of a mixture of Muscone and α-methyl-cyclopentadecanone from β-methyl-cyclopentadecenecarboxylate and γ-methyl cyclopentadecene-carboxylate An apparatus consisting of a 250 ml. flask equipped with an additional funnel, mechanical stirrer, thermometer, ice bath and nitrogen purge is charged with 42 ml. of concentrated sulfuric acid and cooled to 5°C. 19.0 g. of the mixture of β-methyl-cyclopentadecene-carboxylate and γ-methyl--cyclo-pentadecene-carboxylate are added over a period of one-half hour while maintaining the temperature at 5°C. 50 ml. of chloroform are then added, and the mixture warmed to 40°C and at this temperature 6.2g. of sodium azide are added over a period of 1 hour. The resultant mixture is stirred for 15 minutes at 40°C, and cooled to 5°C and the mixture is poured into 200 ml. of wet ice. This entire mixture is then transferred into a micro-steam distillation apparatus and steam distilled at steam temperatures of 100°C–160°C–200°C and the distillate is collected. The distillate is saturated with solid sodium chloride and extracted four times with 50 ml. portions of ether. The ether extract is then washed with 50 ml. of a saturated sodium chloride solution and dried. The solvent is removed yielding 12.0 g. of crude material which is chromatographed to obtain 10.5g. of a mixture of muscone and α-methyl cyclopentadecanone. NMR analysis showed 70 percent muscone and 30 percent α-methyl-cyclopentadecanone.

EXAMPLE II

A perfume composition is prepared by admixing the following ingredients in the indicated proportions:

| Ingredient | Parts |
|---|---|
| Geranium, Algerian | 100 |
| Clove | 100 |
| Cassin | 30 |
| Labdanum resin | 60 |
| Castoreum absolute | 10 |
| Sandal | 50 |
| Cedarwood | 150 |
| Ionone residues | 30 |
| Vetwert | 20 |
| Benzyl benzoate | 150 |
| Terpineol | 150 |
| Mixture of Muscone and β-methyl-cyclopentadecanone from Example I | 150 |
| Total | 1,000 |

This perfume composition is found to have a desirable musk fragrance quality.

EXAMPLE III

A total of 100 g. of soap chips is mixed with 1 g. of the perfume composition prepared in Example II until a substantially homogeneous composition is obtained. This homogeneous composition is then pressed into a bar having a desirable musk scent.

What is claimed is:

1. The process for the preparation of a mixture of muscone and α-methyl cyclopentadecanone comprising the steps of:

a. epoxidizing 1,9-dyclohexadecadiene with a peracid in the presence of an alkali-metal carboxylate to obtain 1,2-epoxy-9-cyclohexadecene;

b. treating the 1,2-epoxy-9cyclohexa-decene with an alkyl lithium compound at a temperature of from about 50°C to 80°C to obtain an α,β-unsaturated-cyclohexadecenoe;

c. oxidizing the α,β-unsaturated-cyclohexadecenol with chromic acid to obtain αβ-unsaturated-cyclohexadecenone;

d. treating the α,β-unsaturated-cyclohexadecenone with an alkyl magnesium halide in the presence of cuprous chloride and in an inert anhydrous solvent to obtain β-methyl-cyclohexadecenone;

e. hydrogenating the β-methylcyclohexadecenone to obtain homomuscone;
f. brominating the homomuscone to obtain 3-methyl-2,16-dibromocyclohexadecanone;
g. rearranging 3-methyl-2,16-dibromo cyclohexadecanone with an alkalimetal alkoxide to obtain a mixture of β-methyl cyclopentadecenecarboxylate and γ-methyl-cyclopentadecene-carboxylate; and
h. treating the mixture of β-methylcyclopentadecene-carboxylate and γ-methyl cyclopentadecene-carboxylate with hydrazoic acid to obtain the mixture of muscone and α-methyl-cyclopentadecanone.

* * * * *